United States Patent
Ornstein et al.

(10) Patent No.: US 10,452,249 B2
(45) Date of Patent: Oct. 22, 2019

(54) TOOLTIP FEEDBACK FOR ZOOM USING SCROLL WHEEL

(71) Applicant: Oracle International Corporation, Redwood Shores, CA (US)

(72) Inventors: Karin Iancu Ornstein, Arlington, MA (US); Hendrik van den Broek, Lexington, MA (US); Marge Boots, San Carlos, CA (US); Raymond Wong, Foster City, CA (US); Chadwick Chow, Woburn, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 199 days.

(21) Appl. No.: 15/601,780

(22) Filed: May 22, 2017

(65) Prior Publication Data
US 2017/0255376 A1    Sep. 7, 2017

Related U.S. Application Data

(63) Continuation of application No. 13/407,618, filed on Feb. 28, 2012, now Pat. No. 9,678,647.

(51) Int. Cl.
*G06F 3/048*     (2013.01)
*G06F 3/0484*    (2013.01)

(52) U.S. Cl.
CPC ............ *G06F 3/04847* (2013.01); *G06F 2203/04806* (2013.01)

(58) Field of Classification Search
USPC .............................................. 715/771
See application file for complete search history.

(56) References Cited

U.S. PATENT DOCUMENTS

| | | | | |
|---|---|---|---|---|
| 5,995,101 A | * | 11/1999 | Clark | G06F 3/04895 715/711 |
| 6,959,422 B2 | * | 10/2005 | Slaunwhite | G06F 3/023 345/172 |
| 7,439,969 B2 | | 10/2008 | Chithambaram et al. | |
| 7,441,207 B2 | | 10/2008 | Filner et al. | |
| 7,548,238 B2 | | 6/2009 | Berteig et al. | |
| 7,949,642 B2 | | 5/2011 | Yang et al. | |
| 2003/0090471 A1 | * | 5/2003 | Slaunwhite | G06F 3/023 345/172 |
| 2005/0088413 A1 | | 4/2005 | Brewer et al. | |
| 2005/0223328 A1 | | 10/2005 | Ashtekar et al. | |

(Continued)

OTHER PUBLICATIONS

Final Office Action for U.S. Appl. No. 13/407,618, dated Aug. 29, 2014, 11 pages.

(Continued)

*Primary Examiner* — Scott T Baderman
*Assistant Examiner* — Haimei Jiang
(74) *Attorney, Agent, or Firm* — Kilpatrick Townsend & Stockton LLP

(57) ABSTRACT

Tooltip generation for zoom feedback is described. In response to the initiation of a zoom operation, a tooltip is generated. The tooltip shows an established potential zoom level that will be used to execute the zoom operation if no other zoom level is established or selected. Multiple potential zoom levels may be shown within the tooltip before the zoom operation is executed.

18 Claims, 11 Drawing Sheets

(56) References Cited

U.S. PATENT DOCUMENTS

| | | | |
|---|---|---|---|
| 2006/0036971 A1* | 2/2006 | Mendel | G06F 9/451 |
| | | | 715/856 |
| 2006/0132812 A1 | 6/2006 | Barnes et al. | |
| 2007/0033544 A1* | 2/2007 | Fleisher | G06F 3/0481 |
| | | | 715/800 |
| 2009/0193353 A1* | 7/2009 | Sharp | G06Q 10/06 |
| | | | 715/784 |
| 2009/0288035 A1* | 11/2009 | Tunning | G06F 16/9574 |
| | | | 715/784 |
| 2010/0017740 A1 | 1/2010 | Gonzalez Veron et al. | |
| 2010/0058226 A1 | 3/2010 | Flake et al. | |
| 2010/0287512 A1* | 11/2010 | Gan | G06F 16/26 |
| | | | 715/854 |
| 2010/0325578 A1 | 12/2010 | Mital et al. | |
| 2011/0128226 A1* | 6/2011 | Jensen | G06F 3/038 |
| | | | 345/163 |
| 2011/0162221 A1* | 7/2011 | Knoke | G01B 11/03 |
| | | | 33/228 |
| 2011/0316884 A1* | 12/2011 | Giambalvo | G06F 3/04815 |
| | | | 345/660 |
| 2012/0179521 A1* | 7/2012 | Nelson | G06Q 30/02 |
| | | | 705/14.4 |
| 2013/0016255 A1* | 1/2013 | Bhatt | G06T 3/40 |
| | | | 348/240.2 |
| 2013/0057472 A1 | 3/2013 | Dizac et al. | |
| 2013/0067420 A1* | 3/2013 | Pittappilly | G06F 3/0236 |
| | | | 715/863 |
| 2013/0174120 A1* | 7/2013 | Kalaidjian | G06F 8/34 |
| | | | 717/113 |
| 2013/0227412 A1 | 8/2013 | Ornstein et al. | |
| 2014/0082536 A1 | 3/2014 | Costa et al. | |
| 2014/0181645 A1* | 6/2014 | MacBeth | G06F 3/04815 |
| | | | 715/249 |

OTHER PUBLICATIONS

Non-final office action for U.S. Appl. No. 13/407,618, dated Jan. 6, 2014, 10 pages.
Non-final office action for U.S. Appl. No. 13/407,618, dated Jun. 26, 2015, 13 pages.
Non-final office action for U.S. Appl. No. 13/407,618, dated Feb. 25, 2016, 15 pages.
Non-final office action for U.S. Appl. No. 13/407,618, dated Jul. 15, 2016, 17 pages.
Notice of Allowance for U.S. Appl. No. 13/407,618, dated Feb. 17, 2017, 16 pages.
Webmapper, "Widget gallery Zooming", map navigation gallery, Retrieved on Jun. 23, 2011, 4 pages, from URL: http://www.webmapper.net/maps/navigation/zooming/horizontal_or_vertical_steps/.

* cited by examiner

TOOLTIP FEEDBACK FOR ZOOM USING SCROLL WHEEL

CROSS-REFERENCES TO RELATED APPLICATION

This Continuation Application claims priority to U.S. Non-Provisional application Ser. No. 13/407,618, filed Feb. 28, 2012, entitled "TOOLTIP FEEDBACK FOR ZOOM USING SCROLL WHEEL", the entire contents of which are incorporated herein by reference for all purposes.

TECHNICAL FIELD

The present disclosure generally relates to zoom functionality for computing systems. More specifically, the present disclosure relates to user interface feedback associated with zoom functionality in computing applications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Zoom operations allow users of computing applications to change the view of the display or a display region within the application. For example, users often "zoom-in" on a particular focal point within a display or display region, causing user interface elements within the display surrounding the focal point to become enlarged, to come into greater focus, or to increase the resolution or level of detail at which the elements are displayed. As used herein, the term user interface element includes any element that may be visible on a user interface. User interface elements that are further away from the focal point of the zoom operation may sometimes be removed from the viewable display area to make room for the enlarged area. Users may also "zoom-out" from a particular focal point, causing user interface elements to shrink or decrease the level of detail at which the elements are shown, sometimes bringing elements outside of the viewable display area into view. A zoom operation may change the scale of the entire display or some aspect of the display.

Zoom functionality has been integrated into a variety of computer-based applications. For example, project management and graphic design programs sometimes allow users to zoom-in or zoom-out to view or edit a graphic at various levels of detail. The level of detail or zoom desired may be selected, for example, using a drop-down list of different zoom levels, or by using some combination of user input device shortcuts.

During a zoom operation such as a zoom-in or zoom-out operation, the display area is often re-rendered in order to reveal or hide additional details about the objects in the display area that are visible or available at one zoom level, but not another. However, the ability to re-render the display area often depends on hardware or network-based resources, and when those resources are limited, re-rendering the display area may affect the user experience. This is particularly true when the user input device being used to select a zoom level is a scrolling mechanism, such as a scroll-wheel on a mouse, as the use of a scrolling mechanism to select a zoom level often results in the user "scrolling through" several zoom levels, causing the display for each intermediate zoom level to be re-rendered, as well as the finally selected zoom level.

Some user input devices are more problematic for performing zoom operations than others. For example, when the user input device includes a scroll wheel that provides no tactile feedback (e.g., a clicking sensation) while a user turns the scroll wheel, the user may accidentally scroll beyond the desired zoom level. Scroll wheels that provide tactile feedback, on the other hand, may help the user to determine an approximate zoom level based on the number of "clicks" the scroll wheel delivers in response to the input. By feeling the feedback from the scroll wheel the user may, over time, associate a certain number of clicks with a certain zoom level. However, many user input devices do not include a tactile feedback mechanism, resulting in the execution of zoom operations at unpredictable zoom levels.

DETAILED DESCRIPTION

General Overview

Figure 1:
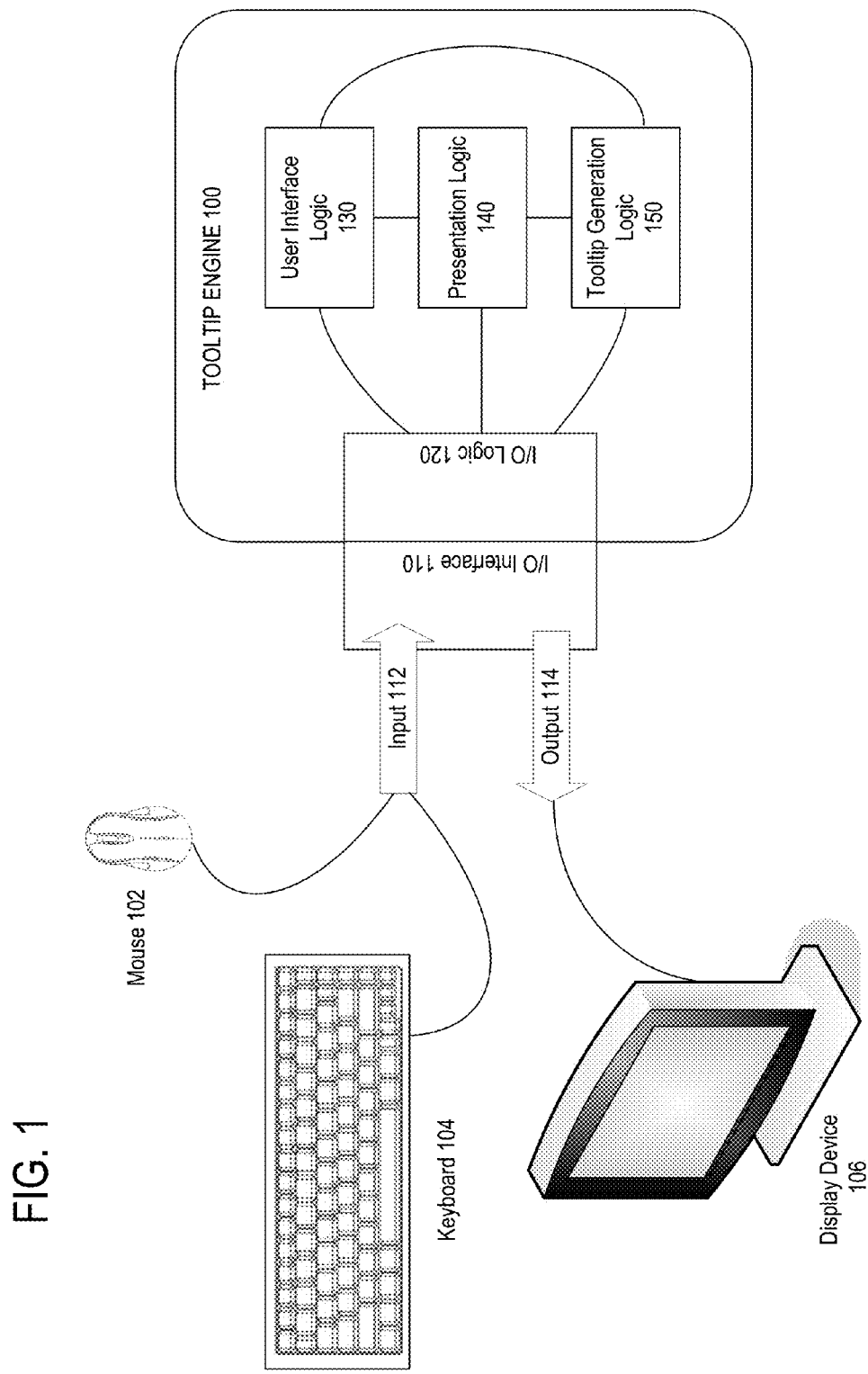
FIG. 1 illustrates a logical block diagram of a computing device on which an embodiment may be implemented.

A tooltip feedback for zoom operations is described. A tooltip, sometimes referred to as an infotip, is a graphical user interface element that appears adjacent to or is otherwise associated with a cursor, such as a mouse pointer. For example, the tooltip may appear adjacent to the cursor in response to a user interface operation. In an embodiment, a tooltip appears in response to the invocation of a zoom operation. For example, a user may initiate a "zoom-in" operation or other zoom operation by holding the Ctrl key on a keyboard while simultaneously scrolling a scroll wheel on a mouse (i.e., turning the scroll wheel) in the forward direction. In response to the zoom operation, a tooltip may appear, displaying a potential zoom level established by the scrolling motion. As the user continues to scroll the mouse wheel, the tooltip is updated to reflect the currently established potential zoom level. When the user releases the Ctrl key or waits for a predetermined amount of time, the zoom-in operation completes the zoom operation by altering the display area to conform to the last-established potential zoom level.

User interface elements are displayed within a display area of a user interface in an embodiment. A user input associated with a zoom operation is received at a computing device. In response to receiving the user input, a potential zoom level for the one or more user interface elements is established. In an embodiment, all user interface elements in the display are affected by a zoom operation. In another embodiment, only selected elements of the display are affected. A tooltip that identifies the potential zoom level is generated and displayed within the display area. In an embodiment, the tooltip is displayed adjacent to a mouse cursor or another user interface element that is associated with the zoom operation.

In an embodiment, additional user input associated with the zoom operation is received. For example, the first input may include the scrolling of a scroll wheel on a mouse, while the additional user input may include additional scrolling of the scroll wheel. In response to receiving the additional user input, a new potential zoom level is established, and the tooltip is updated to identify the new potential zoom level.

In an embodiment, the zoom operation is not executed until a timer expires. This allows the user to select several potential zoom levels without executing the zoom operation at any one of those zoom levels, because the timer is reset each time a new potential zoom level is established. For example, if the time (i.e., amount of time to wait before performing a zoom operation) is set to 5 seconds, and a new potential zoom level is established 3 seconds after the first selection, then the timer is re-established at 5 seconds, causing the countdown to performing the zoom operation to restart. In an embodiment, the zoom operation is performed automatically when the timer expires. In an embodiment, the zoom operation is performed upon another user input event, such as the pressing of a key or the release of a key on a keyboard. Executing or performing the first zoom operation includes displaying at least one user interface element within the display area at the last-established potential zoom level, which may be the most recent potential zoom level shown in the tooltip in an embodiment.

Structural and Functional Overview

FIG. 1 is a simplified block diagram illustrating a tooltip engine 100 on which an embodiment may be implemented. In the embodiment shown in FIG. 1, tooltip engine 100 is a collection of modules 110, 120, 130, 140, and 150, each of which may be implemented in logic such as software logic, hardware logic, or any combination thereof. Tooltip engine 100 includes an input/output (I/O) interface 110 in an embodiment. In another embodiment, I/O interface 110 is not part of tooltip engine 100, but is coupled to tooltip engine 100. I/O interface 110 may be configured to couple tooltip engine 100 to a user input device such as a keyboard 104, mouse 102, trackball, touchpad, touch screen, joystick or any other user input device or pointing device. I/O interface 110 may also be configured to couple tooltip engine 100 to other devices or means of providing or interpreting signals or data such as an input 110, including a network, display device, or transmission media device capable of transmitting or displaying an output 114. In an embodiment, I/O interface 110 may represent multiple I/O interfaces.

Input 112 may include a input from a pointing device and input from a keyboard such as keyboard 104. For example, input 112 may include a signal defining the movement of a scroll wheel on a mouse such as mouse 102 and/or signals from a keyboard that define which button(s) are being or have been pressed. When used in alone or conjunction with one another, the combination of a keyboard event and the scrolling of the scroll wheel may instruct tooltip engine 100 to present a tooltip associated with a zoom level indicated by input 112 in an embodiment. Output 114 may include display data, which may include a user interface element that can be displayed by a display device 106. Output 114 may also include feedback to user input devices such as vibration signals, or other application data.

Tooltip engine 100 includes an I/O logic 120 configured to receive input 112 from I/O interface 110. I/O logic 120 may be configured to store input 112 or information associated with input 112 in non-transitory media, such as volatile or non-volatile storage media. For example, I/O logic 120 may include logging logic.

I/O logic 120 may also be configured to determine a function or a set of function that match a single input or a combination of inputs. For example, a user holding down the Ctrl key on the keyboard while scrolling the scroll wheel on the mouse may correspond to a zoom function. One or more input combinations may correspond to a particular function. I/O logic 120 receives both inputs keyboard and mouse inputs from I/O interface 110, and may determine that the combination of inputs indicates the initiation of a zoom function or operation. In other embodiments, such operation matching may be performed by other elements of tooltip engine 100, such as elements 130, 140, or 150.

I/O logic 120 is communicatively coupled to I/O interface 110, user interface logic 130, a presentation logic 140, and a tooltip generation logic 150 in the embodiment shown in FIG. 1. In other embodiments, additional elements of computer system 100 may be coupled to I/O logic 120. In addition, elements not shown in FIG. 1 may be added in other embodiments, and the configuration of elements of the computing system may differ from the configuration shown in FIG. 1. For example, I/O logic 120 may be incorporated into tooltip generation logic 150 or presentation logic 140, and a database or other storage means may be remotely connected to tooltip engine 100. Tooltip engine 100 may be coupled to a processor, which may comprise hardware logic in the form of one or more central processing units (CPUs) each having one or more cores.

In the embodiment of FIG. 1, user interface logic 130 is communicatively coupled to I/O logic 120 for receiving user input, tooltip generation logic 150, and presentation logic 140. User interface logic 130 may also be coupled to a processor. In an embodiment, user interface logic 130 receives user input from I/O logic 120 and processes the input to determine whether a tooltip should be generated. In an embodiment, user interface logic instructs tooltip generation logic to generate a tooltip for display, and presentation logic 140 generates a user interface that includes the tooltip. In an embodiment, user interface logic 130 may also be communicatively coupled to other elements of tooltip engine 100 that are not shown. In an embodiment, presentation logic is combined with user interface logic 130, which is configured to generate the user interface and user interface elements that may be displayed to a user. For example, referring to FIG. 2A, user interface logic 130 may generate one or more elements of user interface 200 in an embodiment. In an embodiment, a user interface is made up of user interface elements. Some user interface elements may be interactive, while others may not be interactive. User interface elements may be generated based on data in a database, graphics in a graphics repository, or other information that may be retrieved or dynamically generated by tooltip engine 100. In an embodiment, presentation logic generates output 114 that includes the user interface and/or user interface elements.

Tooltip generation logic 150 is communicatively coupled to I/O logic 120, user interface logic, and presentation logic 140. Tooltip generation logic 150 generates tooltip user interface elements (tooltips) based on user input. In an embodiment, tooltip generation logic 150 generates tooltip user interface elements in response to input associated with certain operations, such as zoom operations. For example, a user may request a zoom-in operation or a zoom-out operation by providing input signals or a combination of input 112 signals to I/O interface 110 via one or more user input devices. In response to the input signals or data, included in input 112, tooltip generation logic 150 may generate a particular tooltip to be displayed by presentation logic 140. Tooltip generation logic 150 may provide the tooltip directly to presentation logic 140, or may provide the tooltip to user interface logic 130 to be combined with other user interface and user interface elements before the tooltip is sent to presentation logic 140. Presentation logic 140 then presents the tooltip to the user monitor 106 within output 114. In another embodiment, presentation logic generates instructions for generating a tooltip to be displayed to the user and sends the instructions within output 114. Output 114 may also include other elements of a display such as user interface 200. The tooltip may be stored on a remote storage device or flash memory in an embodiment. The tooltip may be updated by tooltip generation logic 150, and the updated tooltip may be displayed in an embodiment. For example, if a user selects a new zoom level by providing input or a combination of input 112, then tooltip generation logic 150 may update the tooltip or generate a new tooltip to be displayed, and the updated tooltip or new tooltip may be displayed by presentation logic 140.

Zoom Operations

A zoom operation is an operation that causes a portion of a display to be viewed in greater or less detail. For example, a user of a project management or graphic-design application may initiate a zoom operation to zoom-in on a particular area of an image that is being edited. A zoom operation may comprise a zoom-in operation or a zoom-out operation. By zooming in, that particular area is viewed in greater detail, which may require the enlargement of the area. The user may zoom-out, causing the area to be viewed in less detail. However, if the area, or a portion of the area, is reduced in size as a result of the zoom-out operation, then the display may be able to accommodate the viewing of a greater portion of the image, albeit at a lower resolution.

Zoom identifiers may be stored as a sequence of numbers, characters or identifiers. Each zoom identifier in the sequence represents a particular level of detail in an embodiment. When a zoom operation is initiated in response to receiving user input (e.g., from a scroll wheel on a mouse), user interface logic 130 determines the current zoom identifier. In an embodiment, user interface logic 130 first detects the current level of detail at which the user interface is being displayed and determines which zoom identifier is associated with that level of detail. In another embodiment, the current zoom level is retained in memory and retrieved without the detection of the current level of detail of the user interface.

A zoom level represents an amount of change to a user interface or user interface element. For example, a zoom level may represent a magnification percentage or a value with which the current resolution of the user interface is to be multiplied. The zoom level associated with the current level of detail is identified as being associated with the current zoom identifier. In an embodiment, when the scroll wheel is scrolled toward the front of the mouse, the next highest zoom identifier (representing the next-highest level of detail for presenting the user interface) is identified by user interface logic 130 as the selected zoom identifier. As the user continues to scroll forward, the zoom identifier is changed to represent each successive zoom identifier in the sequence of zoom identifiers. For example, if the current zoom identifier is "0," scrolling the mouse wheel forward may cause the zoom identifier "1" to be selected. Further scrolling may cause the zoom identifier "3" and then "4" to be selected. Although zoom identifiers may be used to represent magnification or some other metric associated with zoom operations, this is not required because the zoom identifier can represent a zoom level by association. For example, the zoom level "4" may represent 14% magnification. A relationship for each zoom identifier may be defined in a zoom identifier association table.

Embodiments are not limited to those in which zoom operations increment. For example, if the current zoom identifier is "0," scrolling the mouse wheel backward may cause the zoom identifier "−1" to be selected. Further scrolling may cause the zoom identifier "−2" and then "−3" to be selected, and so on. In addition, scrolling forward may cause the zoom identifier to decrement, while scrolling backward may cause the zoom identifier to increment in an embodiment. In addition, embodiments are not limited to scrolling operations performed using a scroll wheel on a mouse. For example, keys on a keyboard may be used to change the currently selected zoom identifier.

Figure 2A:
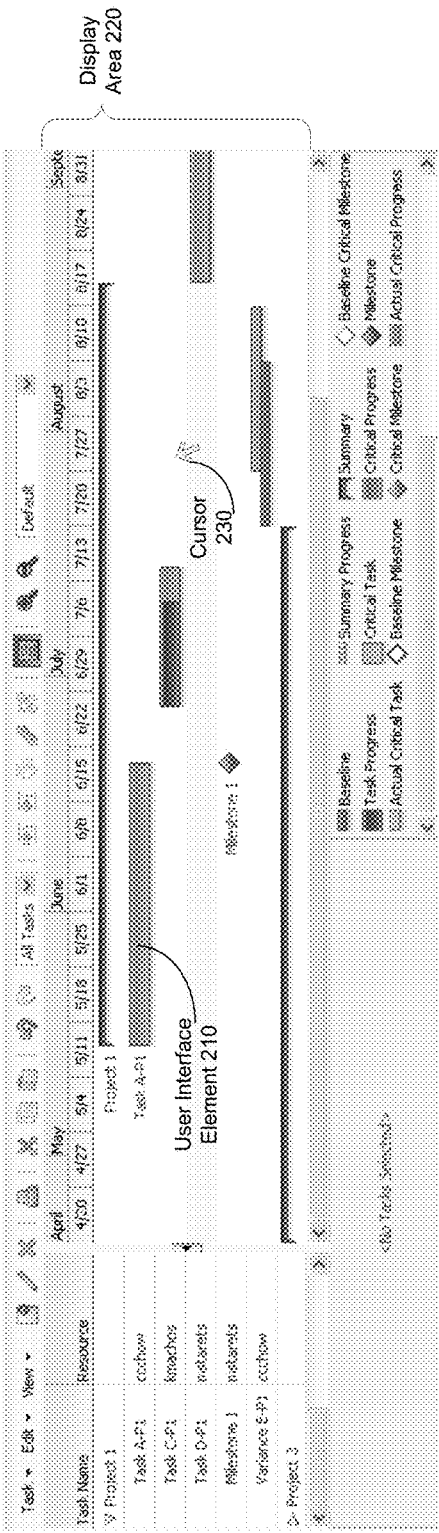
FIG. 2A illustrates a view of display according to an embodiment.

Zoom operations need not cause the size of the user interface to change, as long as a change in detail occurs. In an embodiment, only a portion of the interface is changed. For example, a Gantt chart may be displayed. A Gantt chart is a tool that graphically displays tasks or resources over time. Generally, in a Gantt chart, the time scale over which the tasks and resources are displayed is rendered horizontally across the top of the chart region. A project schedule is illustrated as a series of bars. FIG. 2A illustrates one example of a Gantt chart. When performing a zoom operation on a Gantt chart, it may be unnecessary to increase or decrease the height of a bar, such as user interface element 210. Changing the height of the bar may confuse the viewer, or make the chart difficult to read. The level of detail may instead be shown by increasing or decreasing the length of the bar. In other words, the change in detail may only be applied to the x-axis in an embodiment. In other embodiments, the change in detail may only be applied to the y-axis. A zoom-in operation on Gantt chart 210 may result in the magnification of the x-axis, while leaving the y-axis unchanged on embodiment. In other embodiments, the x-axis and y-axis may be changed disproportionately. For example, a 20% magnification of the x-axis may correspond to a 10% magnification of the y-axis.

Figure 2B:
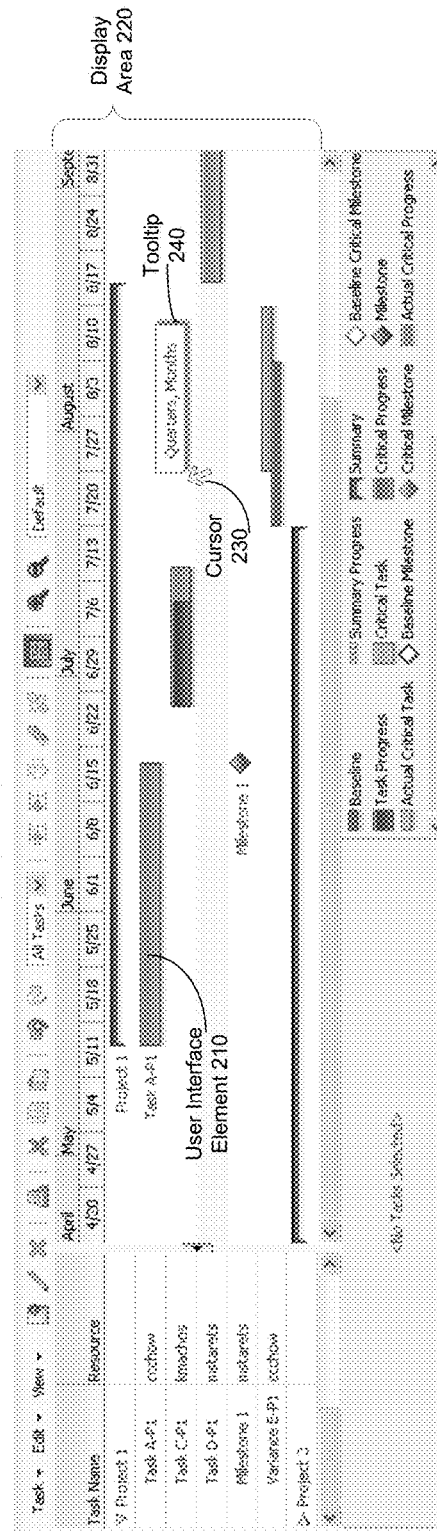
FIG. 2B illustrates a view of display with a tooltip generated in response to the initiation of a zoom operation according to an embodiment.

It is common for a zoom level to be expressed in terms of percentages. The percentage may be related to an "actual," "normal," or "default" resolution or level of detail. For example, if the normal size of a graphic is 200 pixels by 200 pixels, a zoom operation may cause the image to be shown on the display as a 400 pixel by 400 pixel image. The zoom level may be expressed as 200%, indicating that the image is twice the actual size. However, other ways of expressing a zoom level may be appropriate, depending on the type of user interface element being subjected to a zoom operation. Zoom levels may be based on time, distance or any other quantifiable metric. For example, it may be preferable to express zoom levels in terms of days, weeks, months, quarters, and years or any combination of these for a Gantt chart that tracks a project timeline. Any expression of zoom levels may be used in an embodiment. FIG. 2B illustrates the use of time to represent zoom levels by an amount of time. FIG. 2E shows the result of a zoom-out operation that set the zoom level to years, half years.

Tooltip Generation for Zoom Operations

A tooltip is a graphical user interface element that appears to be associated with a cursor, such as a mouse pointer. For example, a tooltip is typically used to identify the function of a button in a user interface when the user interface element includes no identifying text. A tooltip may include text, graphics, or other user interface elements, and may be generated under various conditions in an embodiment. For example, a tooltip may be generated in response to the cursor coming into contact with a tool button that is part of a user interface. Tool buttons often include icons that visually depict the function of the tool, but do not include text that describes what the tool's capabilities are. When the cursor is placed over the tool button, a tooltip that includes descriptive text may be generated and placed next to the cursor in order to better describe the tool's functions. For example, if a user places the cursor over a button with a backward-pointing arrow, a tooltip that includes the text "undo" may be generated and placed next to the cursor, indicating that pressing the button will undo the previous action performed by the user.

In an embodiment, a tooltip is generated in response to the initiation of a zoom operation. Upon initiation of the zoom operation, a tooltip may be generated and displayed before the zoom operation is actually executed. The displayed tooltip may indicate information related to the zoom operation such as the current zoom level prior to the execution of the zoom operation. For example, a user may use the scroll wheel of a mouse while holding the Ctrl key on a keyboard to initiate a zoom operation, meant to either zoom-in or zoom out on the point where the curser is pointing on the display. In response to the initiation of the zoom operation, but before the execution of the zoom operation, a tooltip may be generated by tooltip generation logic 150 and displayed by presentation logic 140 near the cursor. The tooltip may include text that indicates a potential zoom level, such as "125%". This is called a "potential" zoom level because it is the currently established zoom level that is shown in the tooltip. It is not necessarily the current zoon level of the user interface. A potential zoom level may be used to perform the zoom operation if the user desires this, or another potential zoom level may be established by further scrolling through the available zoom levels.

In order to execute a zoom operation at the potential zoom level that is shown in the tooltip, the user may either wait for a timer to expire (a pre-determined amount of time such as 2 seconds) or perform another action (e.g., release the Ctrl button on the keyboard) to indicate a desire to execute (or complete) the zoom operation. For example, the user may release the Ctrl button on the keyboard, causing the zoom operation to execute. In response, the zoom operation will cause the display to zoom-in on the point associated with the curser at a zoom level of 125%.

Several potential zoom levels may be displayed in a tooltip before the execution of a zoom operation in an embodiment. For example, the user may use the scroll wheel of the mouse while holding the Ctrl key on the keyboard to initiate a zoom operation. In response to the initiation of the zoom operation, a tooltip is generated by tooltip generation logic 150 and displayed by presentation logic 140 near the cursor. The tooltip may include the text "125%", indicating a potential zoom level of 125%. Without releasing the Ctrl button on the keyboard, the user may use the scroll wheel on the mouse to scroll even further in the same direction. In response to this additional input 112, the tooltip is updated by tooltip generation logic 150 to reflect a new potential zoom level of 150%. Thus, even though no zoom operation has been executed and the display does not reflect a changed zoom level, two potential zoom levels have been "scrolled through" and shown in the tooltip. Any number of potential zoom levels may be established, and, in response, displayed in a tooltip, before the user finally indicates the desire to execute the zoom operation at the currently established potential zoom level. For example, the user may refrain from providing user input via the scroll wheel on the mouse until a timer expires (e.g., 2 seconds), and the zoom operation will execute in response to the expiration of that timer.

Additional tools for performing a zoom operation may exist independent of the features that employ the tooltip. For example, a zoom level drop-down list may be provided to the user as part of a toolbar. When the user selects a zoom level, a zoom operation is automatically executed, using the zoom level selected in the drop-down list. This feature is different than the feature that relies only on a combination of user input without pressing a button with associated functionality, because the drop-down list or other user interface element takes up space on a toolbar. User interface elements also deny the user the use of the pointing device as a mechanism for selecting the portion of the user interface the user wishes to be the focus of the zoom operation, because the pointing device must be used to select the zoom level from the drop-down list or other user interface element. In an embodiment, the tooltip is updated independently of the zoom level shown in the drop-down list. For example, the user may use the scroll wheel of the mouse while holding the Ctrl key on the keyboard to initiate another zoom operation. In response to the initiation of the zoom operation, a tooltip is generated by tooltip generation logic 150 and displayed by presentation logic 140 near the cursor. In an embodiment, the tooltip need not appear near the cursor. For example, the tooltip may appear within the display area, such as display area 200. The tooltip may include the text "125%", indicating a potential zoom level of 125%. The zoom level drop down list will continue to show the currently displayed zoom level as the tooltip is updated to reflect a potential zoom level. In response to the user indicating the desire to execute the zoom operation, the zoom operation is executed at the currently established potential zoom level, and the zoom level in the zoom level drop-down list is updated to reflect the new, actual, zoom level.

In an embodiment, a tooltip may be generated according to a potential zoom level established for a zoom operation on a Gantt chart. Referring to FIG. 2A, user interface 200 is generated by user interface logic 130 and displayed by presentation logic 140 in an embodiment. User interface 200 includes a display area 220, which includes several user interface elements such as user interface element 210. Cursor 230 is also shown within the boundaries of display area 220.

FIG. 2B illustrates a view of user interface 200 that includes tooltip 240, which is generated in response to the initiation of a zoom operation in an embodiment. The current zoom level for FIG. 2B is (Months, Days), which means that the level of detail included in the Gantt chart reflects a level of detail that includes some months, and days within those months. Tooltip 240 indicates a currently established potential zoom level of (Quarters, Months), showing that input 112 indicated a zoom-out operation. In an embodiment, the user may use the scroll wheel on the mouse to scroll in the opposite direction to change the operation into a zoom-in operation. As the user continues to select different potential zoom levels, tooltip 240 is updated to reflect each new potential zoom level.

Figure 2C:
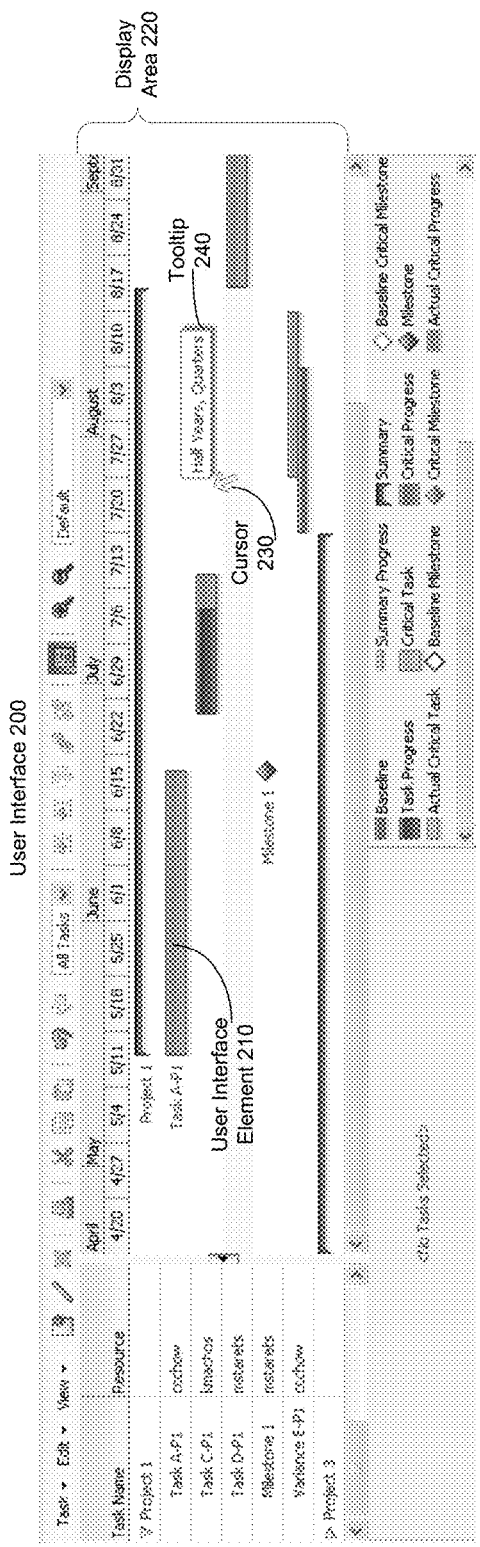
FIG. 2C illustrates a view of display with an updated tooltip according to an embodiment.
Figure 2D:
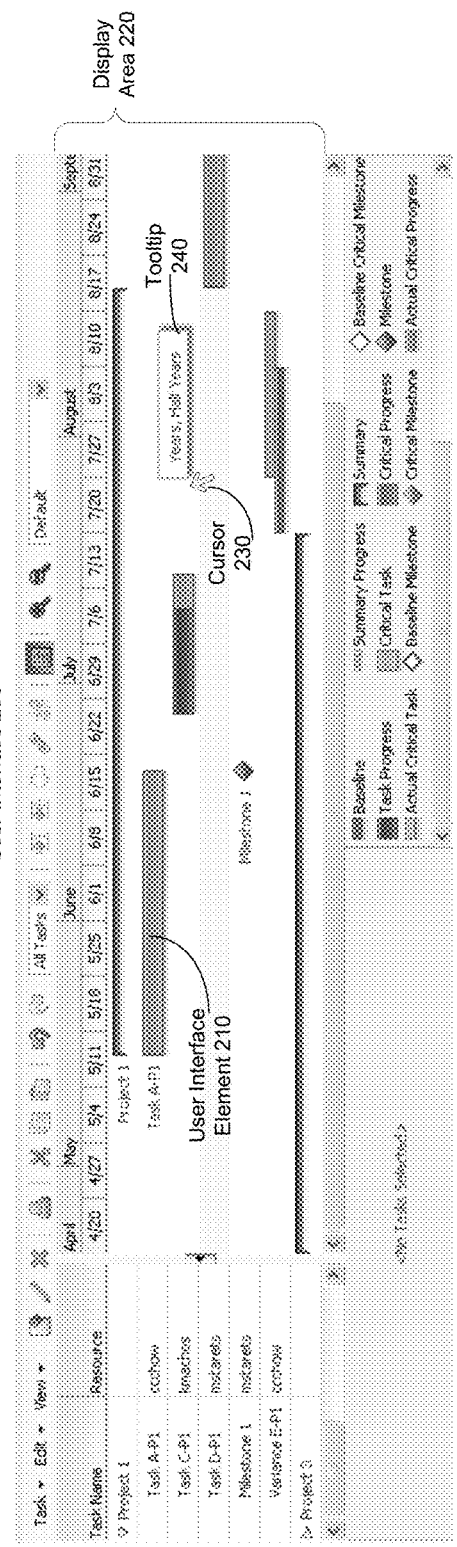
FIG. 2D illustrates a view of display with an updated tooltip according to an embodiment.
Figure 2E:
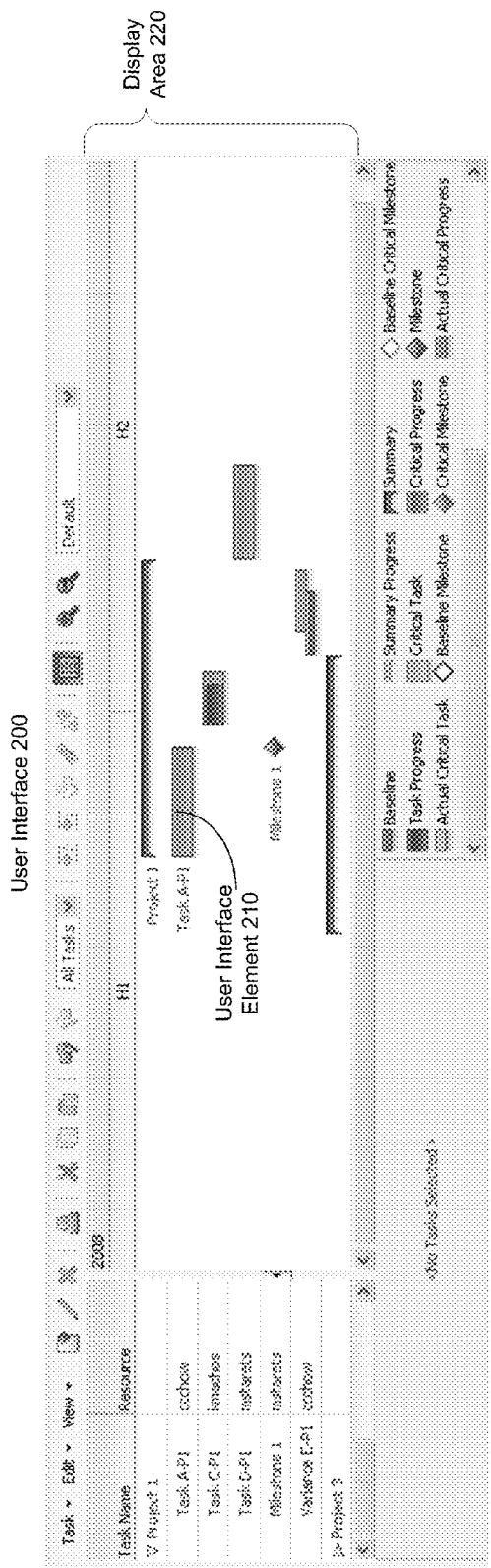
FIG. 2E illustrates a view of display after a zoom operation has been performed according to an embodiment.

FIG. 2C illustrates a view of user interface 200 that reflects an updated tooltip 240. Even though the actual zoom level of display area 220 has not changed, the potential zoom level shown in tooltip 240 is (Half Years, Quarters). FIG. 2D illustrates a view of user interface 200 that reflects another change to tooltip 240. Again, the actual zoom level of display area 220 has not changed, but the potential zoom level shown in tooltip 240 is (Years, Half Years). After selecting the potential zoom level of (Years, Half Years), the user can use a predetermined mechanism for indicating the desire to execute the zoom operation at the currently established potential zoom level. For example, the user may wait for 2 seconds to cause the execution of the zoom operation in an embodiment. The expiration of a predetermined amount of time id detected by tooltip generation logic in an embodiment. In another embodiment where the zoom operation is initiated by holding the Ctrl button down on a keyboard while using the scroll button on a mouse to select the potential zoom level, the user may release the Ctrl button and/or wait for a predetermined amount of time to indicate the desire to execute the zoom operation.

FIG. 2E illustrates a view of user interface 200 that reflects an updated display area 220 after the execution of the zoom operation. User interface element 210 is still within the view of display area 220, but the size of user interface element 210 has changed only horizontally. In an embodiment, the size of user interface elements within a Gantt chart may be reduced vertically and/or horizontally.

Figure 3:
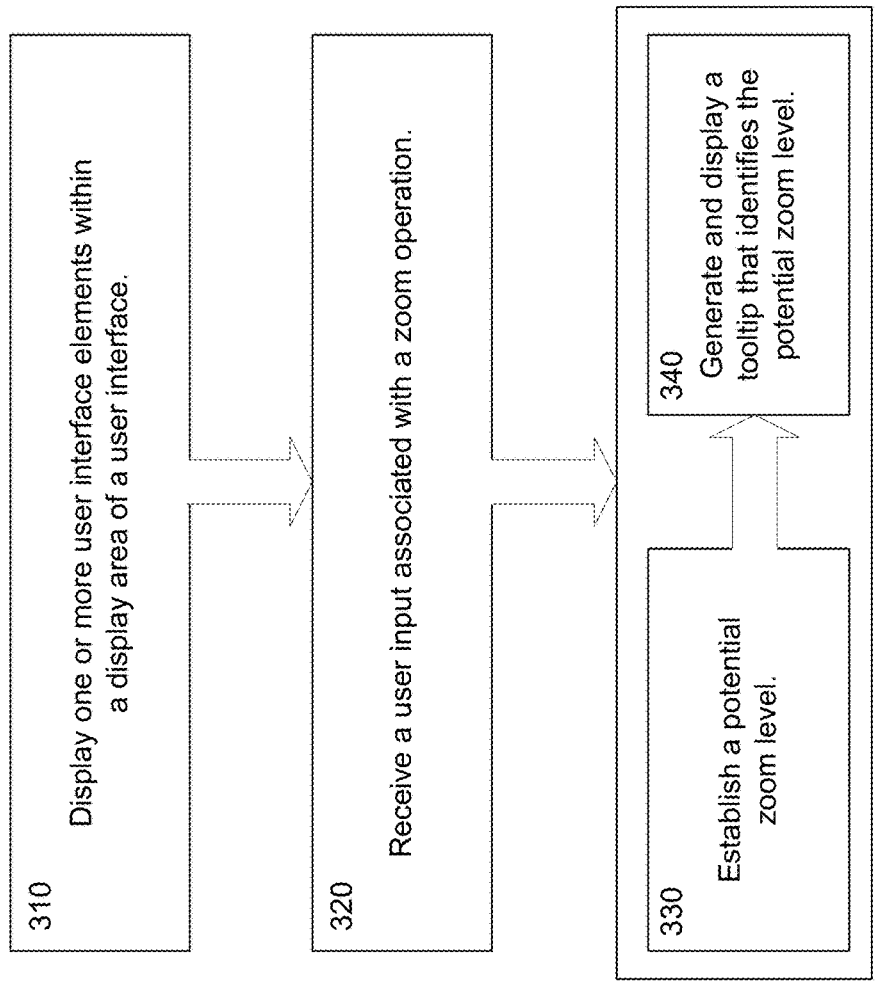
FIG. 3 illustrates a method for generating a tooltip associated with a zoom operation according to an embodiment.

FIG. 3 illustrates a method for generating a tooltip for zoom operations in an embodiment. At step 310, one or more user interface elements are displayed within a display area of a user interface. The user interface elements may be generated by user interface logic 130 and/or presentation logic 140, and may be displayed by presentation logic 140 in an embodiment. At step 320, user input 112 associated with a zoom operation is received. For example, the user may, while depressing the Ctrl button on a keyboard, scroll the scroll wheel on a mouse. At step 330, in response to user input 112, a potential zoom level is established by tooltip generation logic 150. At step 340, a tooltip that identifies the potential zoom level is generated by tooltip generation logic 150 and displayed by presentation logic 140 or by an application or device receiving instructions from presentation logic in the form of output 114.

In an embodiment, additional user input 112 is received, and the zoom level displayed by the tooltip is updated to a second potential zoom level by tooltip generation logic 150. If the additional user input is received by tooltip engine 100 before the zoom operation is performed, then the second potential zoom level becomes the selected level at which to perform the zoom operation.

Figure 4:
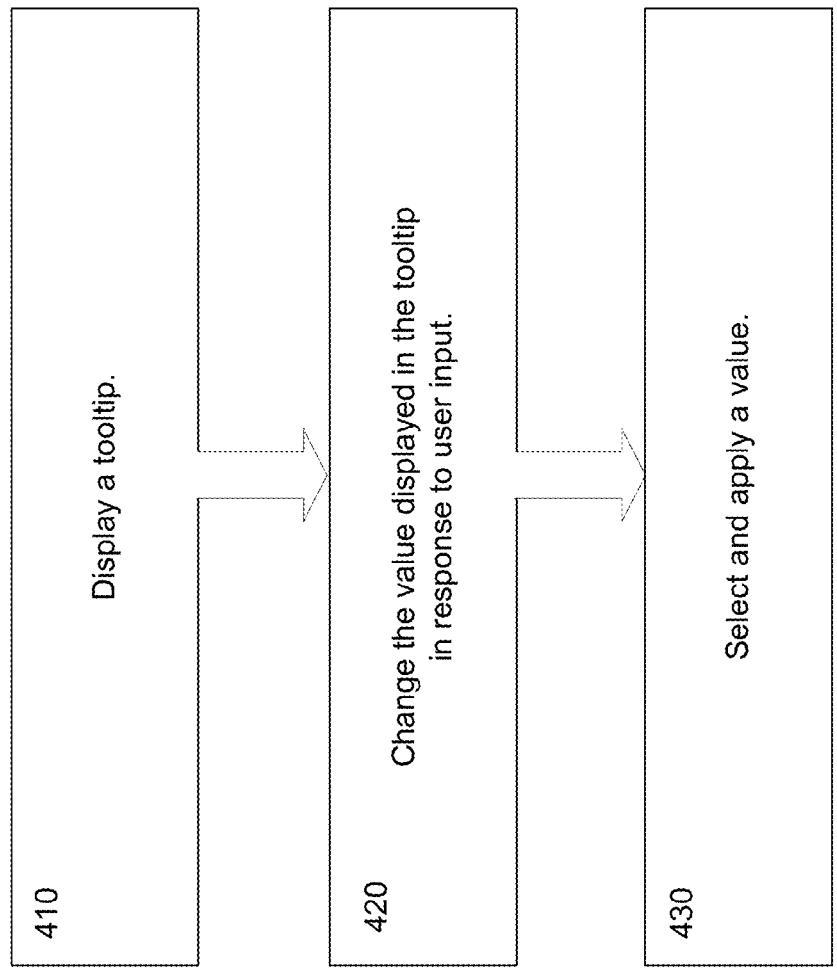
FIG. 4 illustrates a method for using a tooltip according to an embodiment.

FIG. 4 illustrates a method for using a tooltip according to an embodiment. At step 410, a tooltip is displayed. For example, presentation logic may provide a tooltip within output 114 to be displayed on display device 106. At step 420, the value displayed in the tooltip is changed in response to user input. For example, the value of the tooltip may be changed from a zoom level of "weeks, months" to a zoom level of "months, years" in response to user input from a scroll wheel on a mouse. At step 430, a zoom level is selected and applied.

Figure 5:
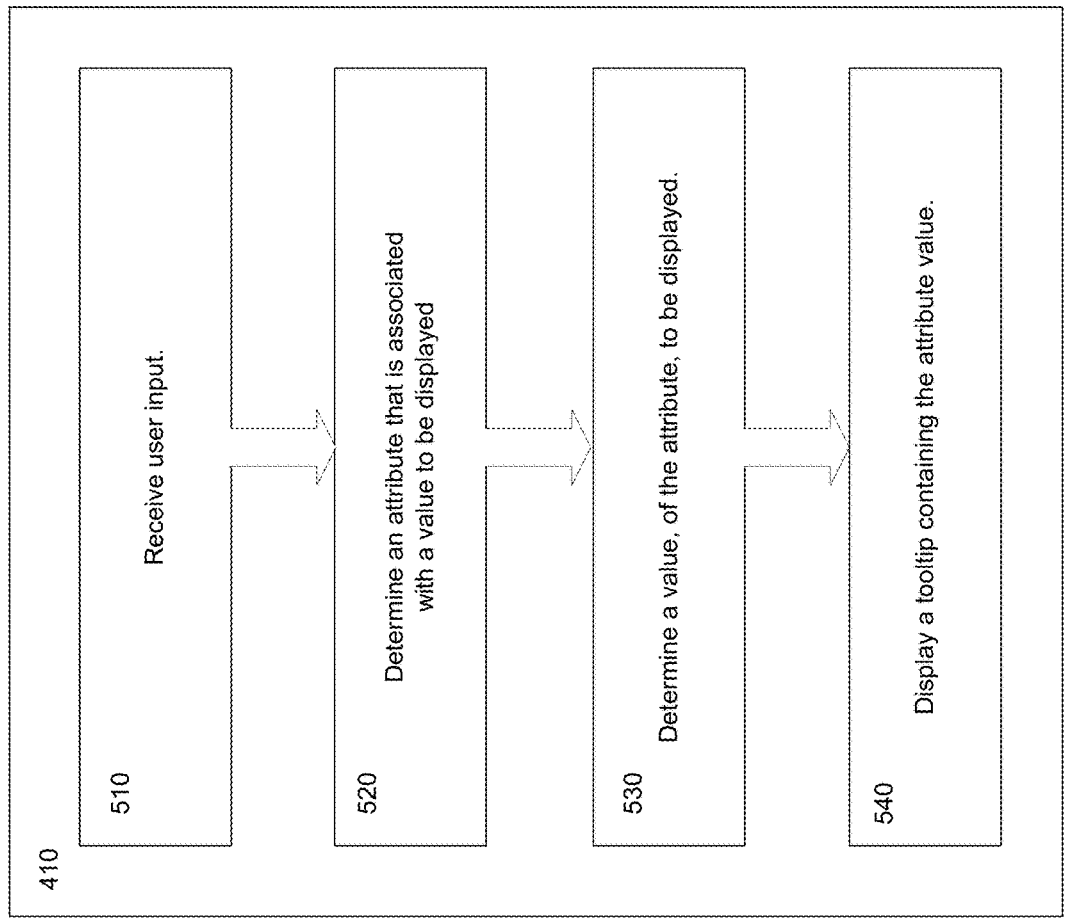
FIG. 5 illustrates a method for displaying a tooltip according to an embodiment.

FIG. 5 illustrates a method for displaying a tooltip according to an embodiment. At step 510, user input is received. For example, a user may provide input by rotating the scroll wheel on an mouse. As step 520, an attribute that is associated with a value to be displayed is determined. This attribute need not be a zoom level, but may be associated to a zoom level. For example, the attribute may be a zoom identifier. At step 530, a value associated with the attribute determined in step 520 is determined. This value may be a zoom level or text associated with a zoom level. For example, 125% is a value that may be used to indicate a magnification of 125% in step 530. At step 540, a tooltip containing the attribute value is displayed. For example, a tooltip containing the text "125%" may be displayed in an embodiment.

Figure 6:
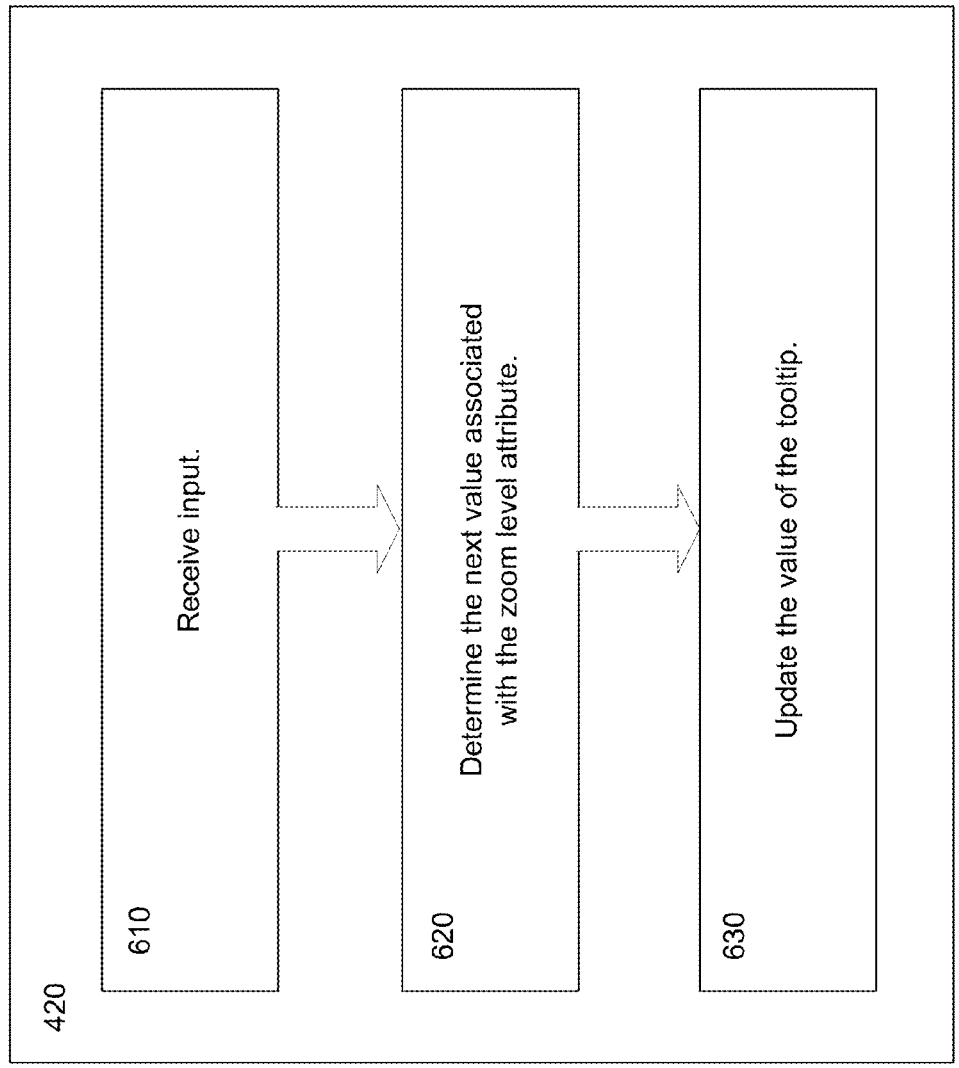
FIG. 6 illustrates a method for changing the value displayed in a tooltip according to an embodiment.

FIG. 6 illustrates a method for changing the value displayed in a tooltip according to an embodiment. At step 610, input is received. In en embodiment, to change the value of an existing tooltip, the user input must be received before a timer expires. Examples of user input include input from a keyboard, mouse, or other user input device. At step 620, the next value associated with the zoom level attribute is determined. For example, the next zoom identifier available based on the user input may indicate that the value of the tooltip should be changed to "150%" in an embodiment. At step 630, the value of the tooltip is updated to reflect the next available zoom level.

Figure 7:
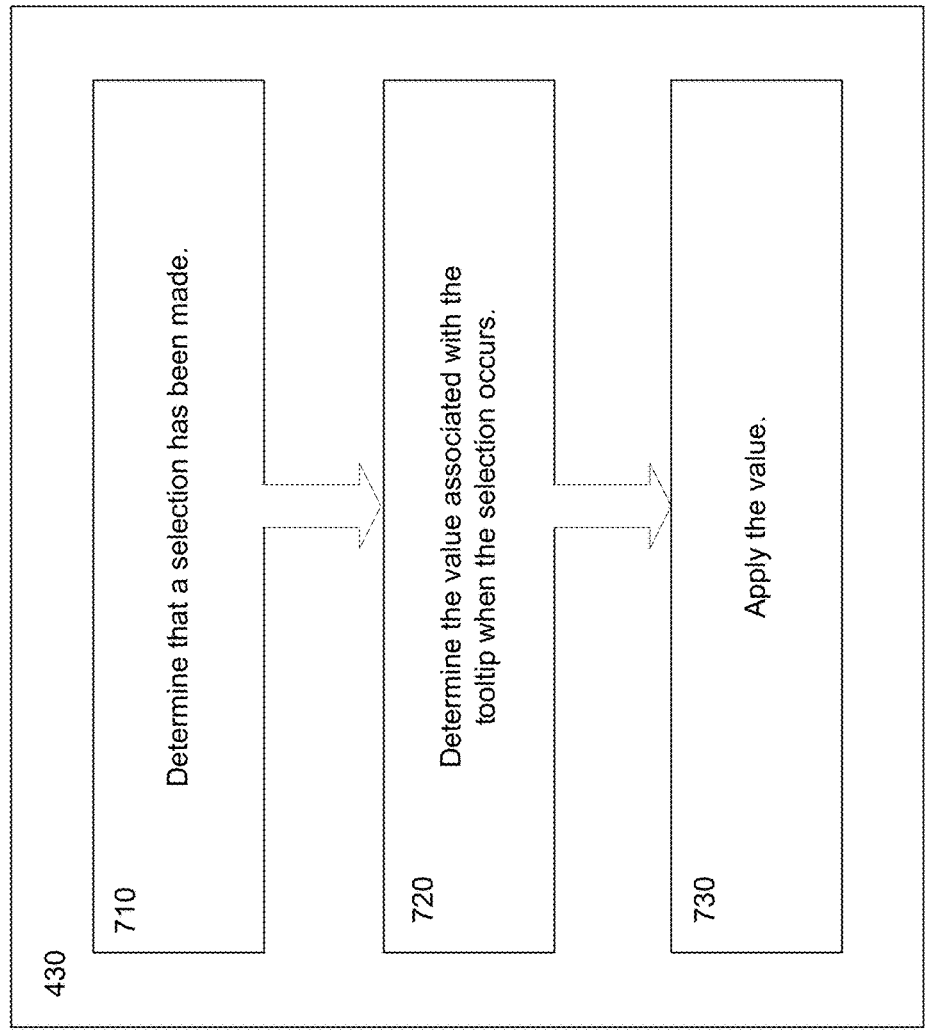
FIG. 7 illustrates a method for applying a value displayed in a tooltip to a zoom operation according to an embodiment.

FIG. 7 illustrates a method for applying a value displayed in a tooltip to a zoom operation according to an embodiment. At step 710, it is determined that a selection of a zoom level has been made. For example, the user may provide additional user input by pressing a key on a keyboard to indicate the selection of a zoom level in an embodiment. In another embodiment, the user may refrain from providing user input for a predetermined amount of time. Allowing this timer to expire is interpreted by tooltip engine 100 as a selection of the last zoom level displayed by or associated with the tooltip. At step 720, the value associated with the tooltip when the selection occurred is determined. This determination may be made by reading a memory that stores the most recent value, identifier, and/or zoom level associated with the tooltip. At step 730, the value is applied.

In an embodiment, a predetermined amount of time to wait before performing a zoom operation is established as a timer by tooltip generation logic 150. In response to receiving the second user input before the timer expires, the timer reset. For example, a timer may be set for three seconds so that a zoom operation will execute using the zoom level shown in the tooltip if no changes to the tooltip are made within three seconds. In this case, if a first zoom level is selected for presentation in the tooltip, the zoom operation will execute within three seconds unless additional input is received. However, if additional input that is associated with a zoom operation is received within three seconds (e.g., with one second left), causing the zoom level shown in the tooltip to change, then the timer is reset. In the embodiment described heretofore, the timer would be reset to three seconds. In response to receiving no user input related to a zoom operation before the timer expires, the zoom operation is performed, causing at least one user interface element to be displayed at the last-established potential zoom level, or the last zoom level shown in the tooltip.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
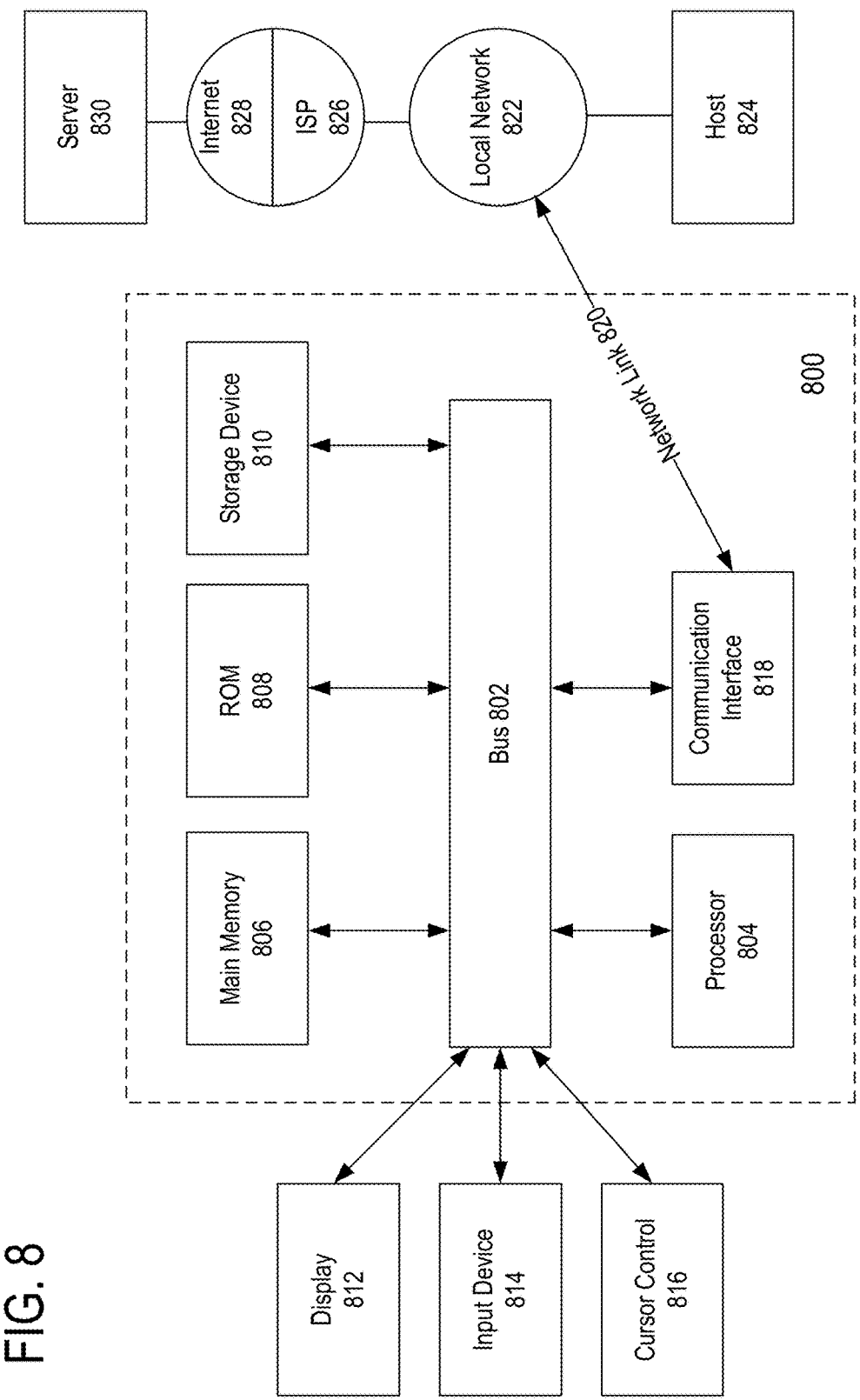
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Figure 9:
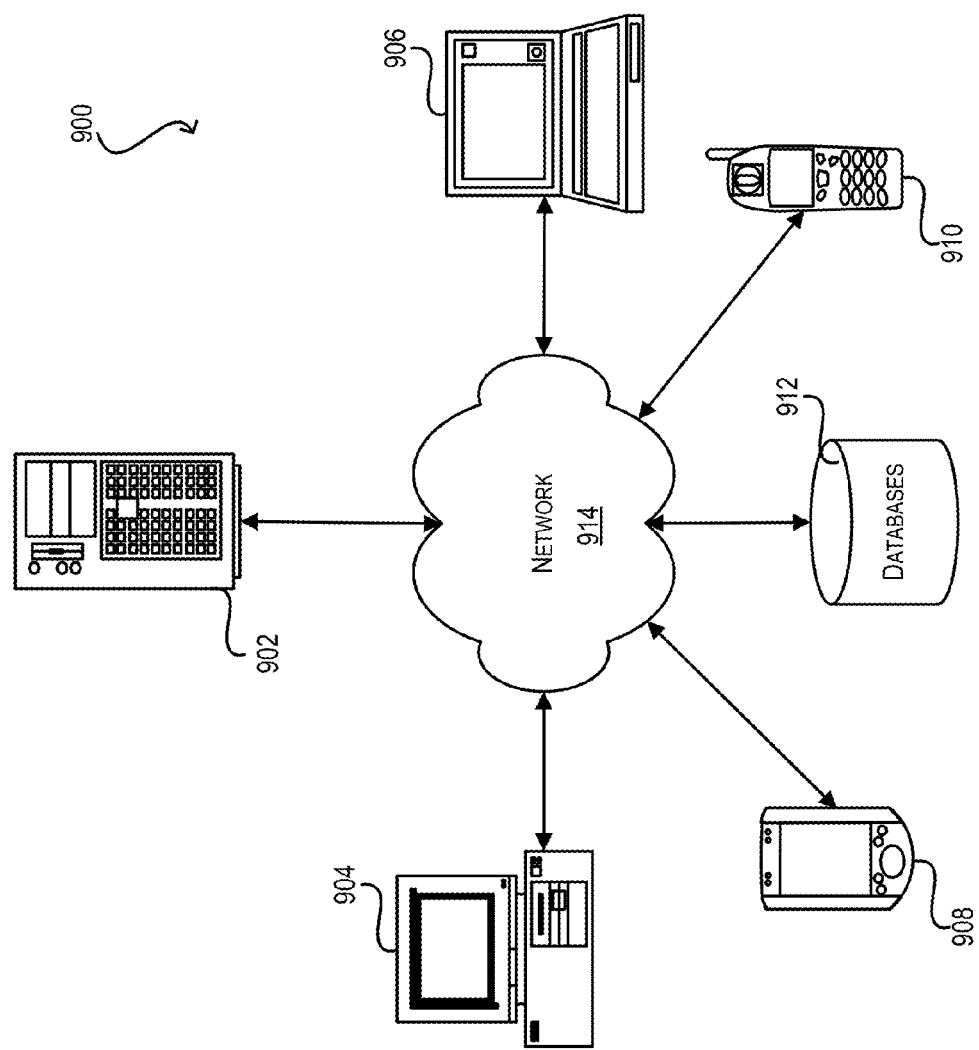
FIG. 9 illustrates a network environment in which an embodiment may be implemented.

FIG. 9 is a simplified block diagram illustrating components of a system environment 900 that may be used in accordance with an embodiment of the present invention. As shown, system environment 900 includes one or more client computing devices 904, 906, 908, and 910 which are configured to operate a client application such as web browser, proprietary client (e.g., Oracle Forms), and/or the like. In various embodiments, client computing devices 904, 906, 908 and 910 are used by tooltip engine 100 of FIG. 1 to interact with an enterprise application. For example, client computing devices 904, 906, 908 and 910 may be used to access user interfaces of the enterprise application to tooltip engine 100 as described herein. Additionally, client computing devices 904, 906, 908 and 910 may be used to execute an outsourced or in-house business function within the application, such as via user interface 814 of FIG. 8.

Client computing devices 904, 906, 908 and 910 may be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 904, 906, 908, and 910 may be any other electronic device, such as a thin-client computer, Internet-enabled gaming system, and/or personal messaging device, capable of communicating over a network (e.g., network 914 described below). Although exemplary system environment 900 is shown with four client computing devices, any number of client computing devices may be supported.

In embodiments, system environment 900 includes a network 914. Network 914 may be any type of network familiar to those skilled in the art that can support data communications using any of a variety of commercially-available protocols, including without limitation TCP/IP, SNA, IPX, AppleTalk, and the like. Merely by way of example, network 910 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 900 also includes one or more server computers 902 which may be general purpose computers, specialized server computers (including, merely by way of example, PC servers, UNIX servers, mid-range servers, mainframe computers rack-mounted servers, etc.), server farms, server clusters, or any other appropriate arrangement and/or combination. In various embodiments, server 1102 may be adapted to run one or more services or software applications described in the foregoing disclosure. For example, as shown in FIG. 9, server 902 may act as an enterprise application server configured to execute an enterprise application or one or more other software applications performing the steps of FIGS. 3-7.

Server 902 may run an operating system including any of those discussed above, as well as any commercially available server operating system. Server 902 may also run any of a variety of additional server applications and/or mid-tier applications, including web servers, FTP servers, CGI servers, Java servers, database servers, and the like. Exemplary database servers include without limitation those commercially available from Oracle, Microsoft, Sybase, IBM and the like.

System environment 900 may also include one or more databases 912. For instance, databases 1114 may include an application database configured to store transactional data for an enterprise application, a security database configured to store security information pertaining to various business functions of the application, as well as any other type of database or data storage component described in this disclosure. Databases 912 may reside in a variety of locations. By way of example, one or more of databases 912 may reside on a storage medium local to (and/or resident in) one or more of the computers 904, 906, 908 and 910. Alternatively, databases 912 may be remote from any or all of the computers 904, 906, 908 and 910, and/or in communication (e.g., via network 914) with one or more of these. In one set of embodiments, databases 912 may reside in a storage-area network (SAN) familiar to those skilled in the art. Similarly, any necessary files for performing the functions attributed to the computers 904, 906, 908 and 910 may be stored locally on the respective computer and/or remotely, as appropriate.

In one set of embodiments, databases 912 may include relational databases, such as Oracle 10g, that are adapted to store, update, and retrieve data in response to SQL-formatted commands.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    displaying content at a first zoom level within a first display area of a user interface;
    detecting that a scroll wheel is being scrolled in accordance with a zoom operation;
    while the scroll wheel is being scrolled, updating a magnitude of zoom displayed in a tooltip in accordance with the scrolling of the scroll wheel, wherein the tooltip is displayed within the first display area and indicates the magnitude of zoom;

delaying updating a change in a zoom level of the content displayed within the first display area until a previously depressed key has been released; and in response to determining that the previously depressed key has been released, zooming the content to a second zoom level corresponding to the magnitude of zoom displayed in the tooltip.

2. The method according to claim 1, further comprising displaying the content in the first display area in accordance with the second zoom level corresponding to the magnitude of zoom displayed in the tooltip.

3. The method according to claim 1, further comprising displaying a portion of the content in the first display area in accordance with the second zoom level corresponding to the magnitude of zoom displayed in the tooltip.

4. The method according to claim 1, wherein the tooltip is a graphical user interface element associated with a cursor.

5. The method according to claim 1, wherein the tooltip is a graphical user interface element appearing adjacent to a cursor location.

6. The method according to claim 1, wherein the tooltip is displayed in response to invocation of the zoom operation.

7. The method according to claim 1, further comprising:
establishing a timer associated with the zoom operation; and
in response to the previously depressed key being released before the timer expires resetting the timer.

8. The method according to claim 1, further comprising:
establishing a timer associated with the zoom operation; and
in response to receiving no user input related to the zoom operation before the timer expires, zooming the content to the second zoom level corresponding to the magnitude of zoom displayed in the tooltip.

9. The method according to claim 1, wherein the zoom operation comprises zooming one of an x-axis and a y-axis of a chart.

10. A non-transitory computer-readable storage medium storing a plurality of instructions executable by one or more processors, the plurality of instructions comprising:
displaying content at a first zoom level within a first display area of a user interface;
detecting that a scroll wheel is being scrolled;
while the scroll wheel is being scrolled, updating a magnitude of zoom displayed in a tooltip in accordance with the scrolling of the scroll wheel, wherein the tooltip is displayed within the first display area and indicates the magnitude of zoom;
delaying updating a change in a zoom level of the content displayed within the first display area until a previously depressed key has been released; and
in response to determining either that the previously depressed key has been released, zooming the content to a second zoom level corresponding to the magnitude of zoom in the tooltip.

11. The computer-readable storage medium according to claim 10, further comprising displaying the content in the first display area in accordance with the second zoom level corresponding to the magnitude of zoom displayed in the tooltip.

12. The computer-readable storage medium according to claim 10, further comprising displaying a portion of the content in the first display area in accordance with the second zoom level corresponding to the magnitude of zoom displayed in the tooltip.

13. The computer-readable storage medium according to claim 10, wherein the tooltip is a graphical user interface element associated with a cursor.

14. The computer-readable storage medium according to claim 10, wherein the tooltip is a graphical user interface element appearing adjacent to a cursor location.

15. The computer-readable storage medium according to claim 10, wherein the tooltip is displayed in response to invocation of a zoom operation.

16. The computer-readable storage medium according to claim 10, further comprising:
establishing a timer associated with a zoom operation; and
in response to the previously depressed key being released before the timer expires resetting the timer.

17. The computer-readable storage medium according to claim 10, further comprising:
establishing a timer associated with a zoom operation; and
in response to receiving no user input related to the zoom operation before the timer expires, zooming the content to the second zoom level corresponding to the magnitude of zoom displayed in the tooltip.

18. A method comprising:
displaying, on a computing device, one or more first user interface elements within a first display area of a user interface;
detecting that a scroll wheel is being scrolled;
while the scroll wheel is being scrolled, delaying a first zoom operation relative to the one or more first user interface elements and updating a magnitude of zoom based on an extent to which the scroll wheel has been scrolled;
while the scroll wheel is being scrolled, updating a value indicated as a zoom identifier displayed in a first tooltip, wherein the value associated with the magnitude of zoom, and wherein the first tooltip is displayed within the first display area to indicate the magnitude of zoom without performing the first zoom operation;
while delaying the first zoom operation, determining that a previously depressed key has been released; and
in response to determining, while delaying the first zoom operation, that the previously depressed key has been released, ceasing to delay the first zoom operation and performing the first zoom operation by zooming a display of the one or more first user interface elements at the magnitude of zoom.

* * * * *